(12) United States Patent
Berfield

(10) Patent No.: US 6,481,107 B2
(45) Date of Patent: Nov. 19, 2002

(54) ROTARY FLAIL FEEDING DEVICE AND METHOD

(76) Inventor: Robert C. Berfield, 3681 Nichols Run Rd., Jersey Shore, PA (US) 17740-8600

( * ) Notice: Subject to any disclaimer, the term of this patent is extended or adjusted under 35 U.S.C. 154(b) by 0 days.

(21) Appl. No.: 09/753,105

(22) Filed: Jan. 2, 2001

(65) Prior Publication Data

US 2002/0129498 A1 Sep. 19, 2002

(51) Int. Cl.$^7$ .............................................. A01D 34/68
(52) U.S. Cl. ........................ 30/276; 30/347; 428/400
(58) Field of Search ................... 30/276, 347; 56/12.7; 428/400

(56) References Cited

U.S. PATENT DOCUMENTS

| 4,054,993 A | 10/1977 | Kamp et al. ................. 30/276 |
| 4,138,810 A | 2/1979 | Pittinger, Sr. et al. ........ 30/276 |
| 4,282,653 A | 8/1981 | Comer et al. ................. 30/276 |
| 5,675,897 A | 10/1997 | Berfield ....................... 30/276 |
| 5,743,019 A | 4/1998 | Berfield ....................... 30/276 |
| 5,807,462 A | 9/1998 | Proulx ......................... 156/433 |
| 5,891,288 A | 4/1999 | Proulx et al. ............... 156/180 |
| 6,045,911 A | 4/2000 | Legrand et al. ............. 428/399 |
| 6,124,034 A | * 9/2000 | Proulx et al. ............. 30/276 X |

* cited by examiner

*Primary Examiner*—Douglas D. Watts
(74) *Attorney, Agent, or Firm*—Thomas Hooker, P.C.

(57) ABSTRACT

A two flail rotary flail feeding device includes a head having an annular line storage cavity, a central post and an annular line feeding passage extending from the cavity to the end of the post. Two flail lines are wound in the cavity, extend through the passage and are wound in a coil around the post. The ends of the flail lines extend outwardly from the post to form flails. Adjacent flail lines wound around the post are connected to each other and move together during lengthening of the flails.

22 Claims, 2 Drawing Sheets

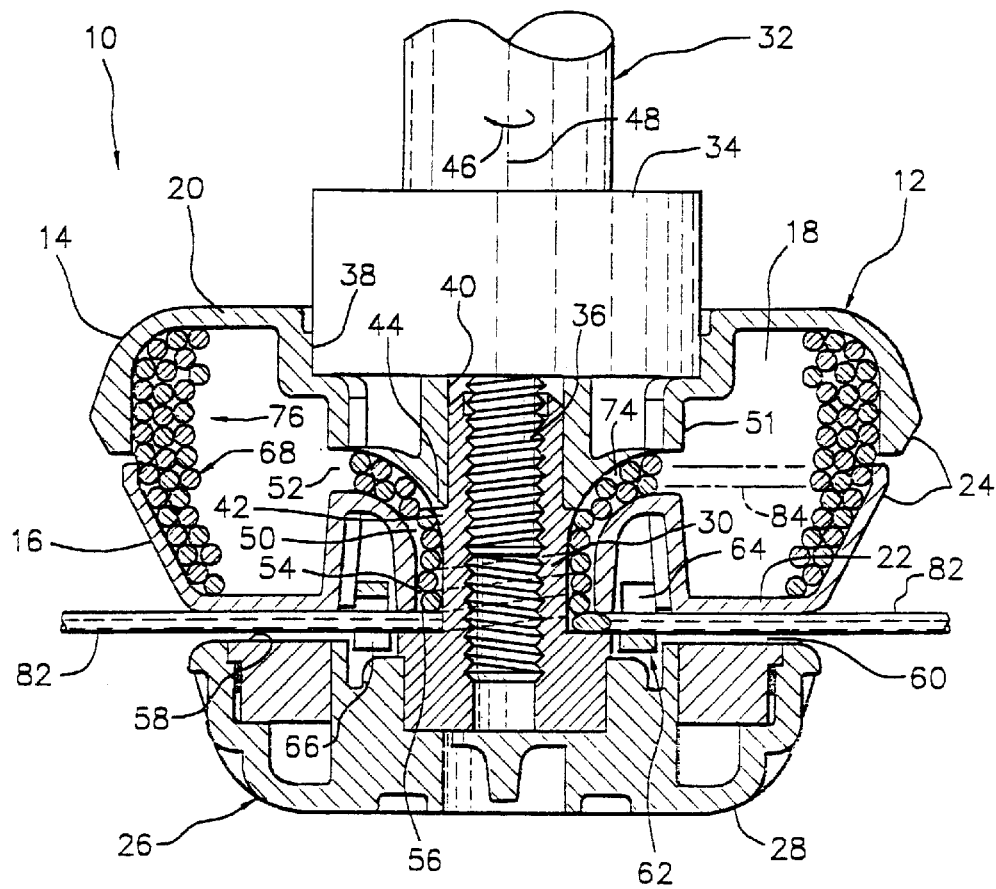
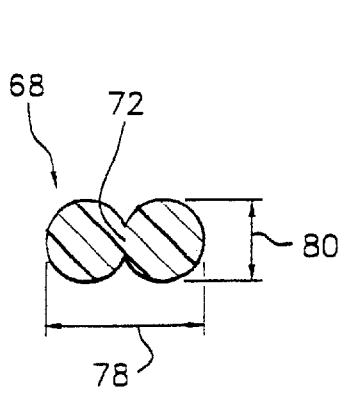
Fig. 3
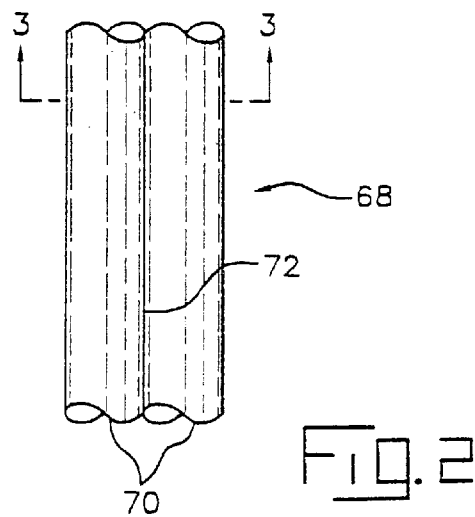
Fig. 2

ROTARY FLAIL FEEDING DEVICE AND METHOD

FIELD OF THE INVENTION

The invention relates to a rotary flail feeding device commonly used to trim grass, weeds and light brush.

DESCRIPTION OF THE PRIOR ART

Rotary flail feeding devices which automatically maintain the length of flails without operator invention are disclosed in my U.S. Pat. Nos. 5,675,897 and 5,743,019. In the disclosed rotary flail feeding devices, two flail lines are wound into an annular line storage cavity and are fed radially inwardly from the cavity to an annular line feeding passage, around a bend and to a cylindrical winding post extending below the cavity. The two flail lines are led outwardly from the post to form flails. The flails are shortened during use of the flail feeding device. Shortened flails are automatically lengthened by feeding additional flail line from the storage cavity, through the passage, around the post and to the flails. During feeding of the two flail lines the line can jam and prevent automatic lengthening of the flails. A jammed head must be disassembled to clear the jam and then reassembled before use can continue. Jams prevent automatic feeding of the two lengths of flail line wound in the storage cavity and are highly undesirable.

Thus, there is a need for an improved two flail rotary flail feeding device capable of reliably feeding of additional flail line to the flails to replenish the flails as the flails are worn during usage. The flail feeding device should assure that flail line is fed to the flails automatically without jams.

SUMMARY OF THE INVENTION

The invention is an improved two flail rotary flail feeding device which automatically and reliably replenishes the flails from flail line wound in a line storage cavity, without jams, and to methods of operating the improved two flail device. The two flail lines are wound around a line winding post in a spiral and move together around and down the post as the flails are automatically lengthened without jams.

Other objects and features of the invention will become apparent as the description proceeds, especially when taken in conjunction with the accompanying drawings illustrating the invention, of which there are four sheets of drawings and two embodiments.

DESCRIPTION OF THE DRAWINGS

FIG. 1 is a vertical sectional view taken through a first embodiment rotary flail feeding device according to the invention;

FIG. 2 is a view of a section of dual-flail line fed by the device of FIG. 1;

FIG. 3 is a sectional view taken along line 3—3 of FIG. 2;

DESCRIPTION OF THE PREFERRED EMBODIMENTS

Figure 4:
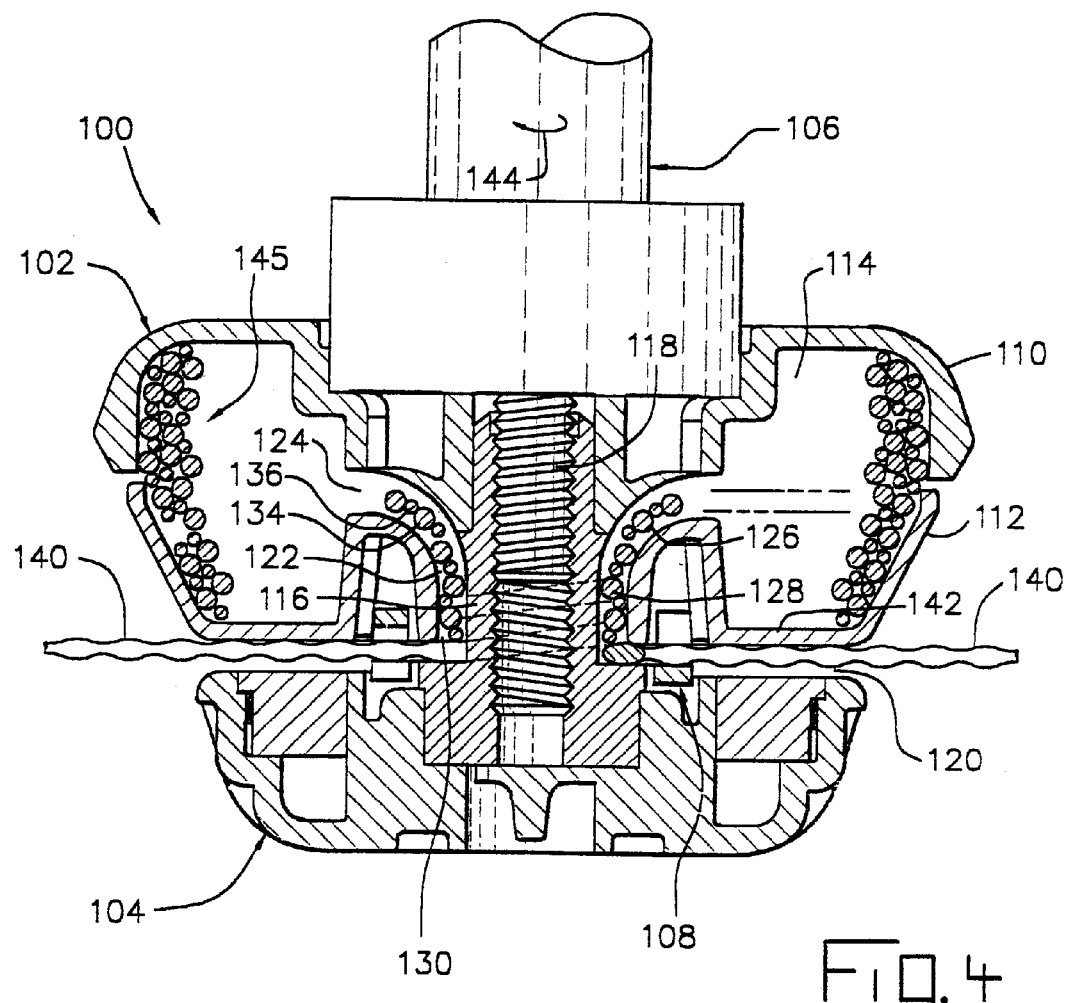
FIG. 4 is a vertical sectional view taken through a second embodiment rotary flail feeding device according to the invention.

The disclosures of Berfield U.S. Pat. Nos. 5,675,897 and 5,743,019 are incorporated herein by reference, in their entireties. U.S. Pat. Nos. 5,675,897 and 5,743,019 disclose rotary flail feeding devices where two lengths of flail line are wound in a storage cavity and are fed radially inwardly, spiral wound around a central post and then fed radially outwardly from the post to form two flails. When the flails are shortened, additional flail line is fed to the flails from coils of flail line on the post by forward unwinding the flails from the post in the direction of rotation of the device.

First embodiment rotary flail feeding device 10 includes a rotary head 12 having a circular hollow top member 14 and circular hollow bottom member 16 which define an annular line storage cavity 18 therebetween. The cavity is bounded by top wall 20 in top member 14, bottom wall 22 in bottom member 16 and outer circumferential walls or skirts 24 on the top and bottom members. Suitable latches (not illustrated) secure the outer walls 24 together to attach the bottom member to the top member.

Line guide and post member 26 is removably mounted on head 12 and includes circular handle 28 located below bottom member 16 and central post or line winding member 30 which extends upwardly from the handle into a central passage 40 in the head.

The flail feeding device 10 is mounted on lower end of rotary drive member 32, member 32 is rotated by a suitable electric motor or gasoline engine in the direction of arrow 46 around device axis 48. The drive member includes a mounting block 34 on the lower end thereof and a threaded stud 36 extending below block 34. Device 10 is assembled by positioning block 34 and threaded stud 36 in block recess 38 formed in the top of member 14 and central passage 40 extending through the head, respectively, and then extending member 26 up toward the bottom of the head to extend winding member into passage 40. The hollow interior of the winding member is threaded to engage stud 36. Handle 28 is rotated to thread member 26 onto the stud and seat member shoulder 42 against head stop surface 44. Continued rotation of handle 28 secures the head on block 34 so that the head 12 and member 26 are rotated by the rotary drive member. Member 26 is manually rotated in a direction opposite to the direction of arrow 46 to thread the member and head on the drive member and prevent loosening during operation of device 10.

The upper member 14 and post 30, and lower member 16 define an annular line feeding passage 50 extending from the inner wall 51 of cavity 18 to the bottom of the post. The passage 50 has a cylindrical inlet opening 52 located in the center of inner wall 51 and facing outwardly into the cavity. The passage includes an upper curved portion 74 which extends from opening 52 inwardly and bends downwardly 90 degrees to a cylindrical winding portion 54 surrounding post 30. Portion 54 extends to circular outlet opening 56 at the bottom of the post. The top wall 58 of handle 28 is spaced a distance below the bottom wall 22 of member 16 to define an annular flail slot 60 opening from the lower end of post 30, immediately below opening 56.

Line directing ring 62 surrounds the lower end of post 30, outwardly of opening 56. The line directing ring is loosely mounted between handle 28 and bottom member 16 to permit rotation of the ring relative to head 10 and member 26. Ring 62 includes an upwardly facing line slot 64 and diametrally opposed downwardly facing line slot 66.

The components of device 10 may be made of metal, plastic or other suitable material.

FIGS. 2 and 3 illustrate dual flail line 68 fed by device 10. Line 68 includes two continuous lengths of cylindrical flail line 70 extending parallel to each other and bonded together at tangential joint 72. The joint extends along the length of line 68. Line 68 is preferably formed from extruded stiffly flexible thermoplastic material of the type used in conventional rotary flail-type trimming devices. The stiffly flexible line has inherent resiliency which tends to straighten bends.

The dual flail line 68 has a width 78 across the side of the line equal to twice the diameter of the individual flail line 70 and a thickness 80 equal to the diameter of the individual flail line 70. The flail line is easily bent about an axis transverse to the length of the line but is difficult to bend about an axis parallel to the length of the line.

Device 10 is loaded with a continuous length of dual flail line 68 wound into cavity 18. In order to load the flail line in chamber 18, member 26 is rotated in the direction of arrow 46 to disengage the member from stud 36 and permit manual removal of head 12 from drive member 32. One end of the continuous length of flail line 68 is then fed into cavity 18 through the open portion 74 of passage 50. The dual flail line is wound against the outer wall of cavity 18 to form a spiral wound coil 76 extending inwardly from the outer wall.

As flail line 68 is wound into cavity 18 the flail line is bent along its length and one side of the line is held against the outer walls 24 of the cavity as multi-layer coil 76 is formed. The inherent resiliency of the dual flail line keeps the individual coils against the outer cavity wall. FIG. 1 illustrates coil 76 partially filling cavity 18. In practice, the coil may nearly completely fill the cavity. The coils of dual flail line wound in cavity 18 are in a generally vertical position with the two individual flail lines 70 in each coil located above and below each other and the sides of the dual line parallel to axis 48. When the chamber 18 has been filled by coil 68 the inner end of the dual flail line is led through passage portion 74. Two individual flail lines 70 are separated from the end of the dual line by breaking joint 72 and are led radially outwardly from the head along bottom wall 22 to form flails 82. Ring 62 is positioned on the bottom wall with one of the flails 82 fitted in slot 64 and the other of the flails 82 fitted in slot 66. The filled head 12 is then fitted on mounting block 34 with stud 36 extending into passage 40 and member 26 is rethreaded onto the stud to complete reloading.

Flail line 68 is preferably wound into cavity 68 from the bottom of head 12 in a direction opposite to the direction of rotation of the device indicated by arrow 46. If desired, flail line 68 may be wound into cavity 18 in the direction of arrow 46, in the direction of rotation of the device by drive member 32.

After filling of chamber 18 and remounting of device 10 on drive member 32 length 84 of vertically oriented flail line extends from the inner circumference of coil 76 into inlet opening 52 and along and down the line feeding passage 50 toward outlet opening 56. The vertical height or width of inlet opening 52 is slightly greater than the width 78 of the vertically oriented dual line 68 led into passage 50 to assure feeding of the vertical line into the passage without jams.

The width of the passage inwardly from opening 52 decreases around curved portion 74 so that the width of the cylindrical passage winding portion 54, which surrounds the post and parallels axis 48, is less than the width 78 of the dual flail line 68 but greater than the thickness 80 of the dual flail line.

After loading of flail line 68 in chamber 18 and reassembly of the device 10 on drive member 32, the electric motor or gasoline engine rotating drive 32 is actuated to rotate the drive at an operating speed in the direction of arrow 46. The two flails 82 extending outwardly from post 30 are thrown radially outwardly by centrifugal force and draw additional dual flail line into passage 50 as described in my U.S. Pat. Nos. 5,675,897 and 5,743,019. The dual flail line is maintained in a vertical orientation with sides parallel to axis 48 as it is fed along passage 50 and is wound around rotating post 30 in the direction of arrow 46, the direction of rotation of device 10. The individual flails 82 are fed radially outwardly in a direction unwinding the flails from the post until the flails reach equilibrium lengths. Then, atmospheric drag and centrifugal forces balance to prevent further unwinding of the flails. During unwinding joint 72 between the flail lines is broken.

During trimming, the outer ends of the flails 82 are abraded to shorten the flails, reduce the drag forces exerted by the flails and permit further forward unwinding of the flails from the coil of dual flail line 68 on post 30. As line 68 is unwound, additional dual flail line is fed into passage 50 and the joint 72 formed between the individual cylindrical line 70 is severed at the lower end of the coil of flail line to permit lengthening of the individual flails 82. Ring 62 maintains 180 degree positioning of the two flails.

The vertically oriented dual flail line 68 with sides parallel to axis 48 is fed smoothly through mouth 52 into passage 50, is wound around the inner surface of the passage and forms a tight coil of dual flail line on post 30. The individual flail lines 70 forming the two flails 82 are maintained joined to each other during the time the dual line is fed from coil 76 radially inwardly through opening 52, into passage 50, wound around post 30 in a coil and down to the lower end of the post to opening 56. Only then is joint 72 ruptured to free the two lines 70 to form individual flails 82. Use of the dual flail line 68 assures proper orientation of the two flail lines 70 which will subsequently form individual flails from the coil, across the cavity and along passage 50. The individual lengths of line which form the flails 82 can not move relative to each other and, as a result, move together and cannot cross over each other to form jams in coil 76 and in passage 50. A jam can prevent feeding of flail line, necessitating disassembly of device 10 and clearing of the jam.

Dual flail line 68 is fed together around and down post 30 in a coil. Simultaneous and equal feeding of the two flail lines 70 prevents jams of flail line in passage 50. Such jams could occur if the two flail lines forming flails 82 are not joined together.

Figures 5, 6, 7:
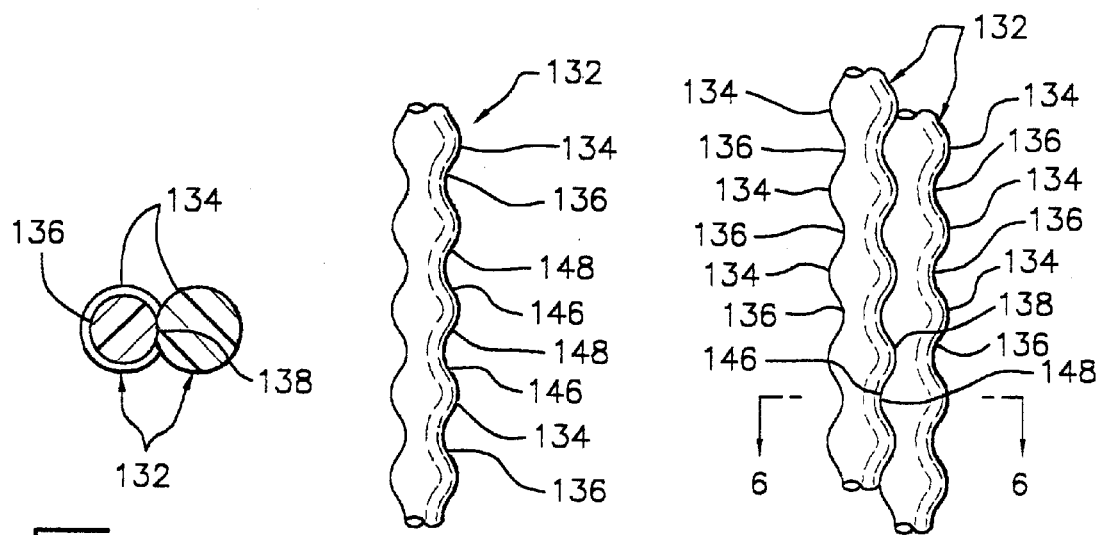
FIG. 5 is a view of a section of interfitted flail lines fed by the device of FIG. 4.
FIG. 6 is a sectional view taken along 6—6 of FIG. 5.
FIG. 7 is a top view of a single length of flail line.

FIG. 4 illustrates a second embodiment flail feeding device 100 and FIGS. 5–7 illustrate the flail line fed by device 100.

Flail feeding device 100 is conventional and includes a rotary head 102 similar to head 10, a line guide and post member 104 identical to member 26 and a rotary drive member 106 identical to drive member 32. Annular line directing ring 108 is rotatably mounted in device 100 between head 102 and member 104 and is identical to line directing ring 62.

Head 102 includes top member 110 and bottom 112, like members 14 and 16, respectively. These members define an annular line storage cavity 114, like cavity 18. Member 104 includes a post or line winding member 116, like post 30. Member 104 is threadably mounted on drive member stud 118, like stud 36, to mount head 102 on drive member 106. When the head is mounted on the drive member annular slot 120, like slot 60, surrounds the lower end of the line feeding passage 122, like passage 50. The passage 122 has an inlet opening 124 on the inner wall of chamber 114, an upper portion 126 which is smoothly curved downwardly 90 degrees and a lower cylindrical winding portion 128 surrounding post 116 and extending to circular outlet opening 130. Passage 122 has an uniform width. In other respects, head 102 and member 104 are identical to first embodiment head 12 and member 26. The components of device 100 may be made from metal, plastic or other suitable material.

FIG. 5 illustrates two like flail lines 132 positioned in side by side contact. Each line 132 is formed from the same plastic material forming flail line 70 fed by device 10. However, flail line 132 does not have a cylindrical cross section. Each flail line 132 includes a series of protrusions 134 spaced along the length of the line with adjacent protrusions separated by reduced diameter waists 136. The protrusions and waists have circular transverse cross sections as illustrated in FIG. 6. The waists and protrusions are regularly spaced along flail lines 132 and have complimentary shapes so that two flail lines 132 may be fitted side by side with tangential contact at a line 138 extending along the length of the flail lines. Thus fitted, the protrusions on one line nest in the waists or recesses formed in the adjacent line. The protrusion—waist engagement between the adjacent lines prevents longitudinal movement of one line past the other line. Each protrusion includes two surfaces 146 and 148. Surface 146 faces one end of the line and surface 148 faces the other end of the line. When the lines are nested as in FIG. 5, surfaces 146 and 148 on different lines engage each other and prevent longitudinal shifting of the lines.

Flail feeding device 100 automatically feeds two lengths of flail line 132 outwardly from the head to form two 180 degree-oriented flails 140. Two lengths of flail line 132 are wound into chamber 114 as previously described. Head 102 is removed from the device to permit manual feeding of two lengths of flail line 132 through the exposed upper portion 126 of passage 122 and into chamber 114. The stiffly flexible flail line is held against the outer wall of the chamber as previously described. However, because the two lengths of flail line wound into the chamber are not physically joined the flail lines may be separated from each other during winding.

After the chamber has been filled with flail line, the ends of the two lines 132 are led outwardly along bottom wall 142 of head 102 and line directing ring 108 is fitted as shown. The head is mounted on drive member 106, following which the guide and line post member 104 is threaded onto stud 108 and tightened to mount the head on the drive member as shown in FIG. 4.

Initial rotation of the flail feeding device 100 in the direction of arrow 144 throws flails 140 radially outwardly through slot 120 and winds the two lengths of the flail line 132 in passage 122 around cylindrical post 116. The protrusions and waists of each flail line wound around post 116 fit into or nest with the waist and protrusions of adjacent flail lines on the post to lock the cylindrical windings together and assure that the windings are rotated and fed together down along the post toward outlet opening 114. The nested engagement between the adjacent flail lines prevents uneven feeding and jams between the flail lines wound around the post.

Two lengths of line 132 are fed inwardly from the coil 145 through mouth 124 and into the upper portion 126 of passage 122. The entire passage 122 has a width slightly greater than the maximum diameter of the flail line at protrusions 134 in order to prevent possible feeding of one flail line past an adjacent flail line in the passage and consequential formation of a flail line jam in the passage.

The pair of flail lines 132 fed by device 100 may be joined together at line contact 138, in the same way flail lines 70 are joined together at joint 72. In this event, the resultant dual flail line has a width greater than its thickness, like dual flail line 68. The dual flail line is wound into chamber 114 in the same way dual line 68 is wound into chamber 18. The width of line feed passage 122 at mouth 124 would have to be increased to accommodate vertically oriented dual flail line fed inwardly from the coil as described previously. The joint between the flail lines is broken as the line is fed from post 116 to the individual flails 140.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention:

1. A rotary device for feeding two flails comprising a head having opposed sides, said head adapted to be rotated by a rotary drive about an axis extending through said opposed sides; the head including an annular line storage cavity inside the head extending around and located a distance radially outwardly from the axis, said cavity located between said opposed sides of the head; a line winding post attached to one side of the head and rotatable with the head, said post extending along the axis to an end at the other side of the head; an annular line passage extending from the cavity radially inwardly and along the post to an annular outlet opening on the other side of the head; and two flail lines wound in the cavity to form a cavity coil of flail line, said flail lines extending from the cavity coil along the line feeding passage to said mouth and outwardly from said mouth and away from said axis to form two flails, said flail lines being spiral wound adjacent each other on the post to form a post coil, and one or more connections between the flail lines wound around the post, wherein the one or more connections prevent movement of the spiral wound flail lines on the post along each. other.

2. The device as in claim 1 wherein said line passage has a uniform width at the post.

3. The device as in claim 1 including a physical connection joining said flail lines together along the length of the flail lines to form a dual flail line having a width greater than the thickness of the dual flail line, said line feed passage having an annular inlet opening, the width of said inlet opening being greater than the width of the dual flail line, and the width of the passage at the post being less than the width of the dual flail line.

4. The device as in claim 3 wherein the width of the flail line is generally parallel to the axis.

5. The device as in claim 3 wherein said one or more connections comprise a rupturable bond joining the flail lines together.

6. The device as in claim 5 when said flail lines are arranged side-by-side and said bond extends between the flail lines and along the length of the flail lines.

7. The device as in claim 6 wherein the flail lines contact each other.

8. The device as in claim 5 wherein said flail lines are formed from a plastic material and said bond comprises an integral plastic joint between said flail lines.

9. The device as in claim 1 wherein said one or more connections comprise interengagable structure on each of said flail lines.

10. The device as in claim 9 wherein said structures comprise wide and narrow features spaced along the length of each flail line, the wide features on one flail line engaging the narrow features on the other flail line when the flail lines are wound around the post.

11. The device as in claim 9 wherein said structure includes surfaces on each flail line facing in opposite directions along the flail line.

12. A rotary device for feeding two flails comprising a head having opposed sides, said head adapted to be rotated by a rotary drive about an axis extending through said opposed sides; the head including an annular line storage cavity inside the head extending around and located a distance radially outwardly from the axis, said cavity located between said opposed sides of the head; a line winding post attached to one side of the head and rotatable with the head, said post extending along the axis to an end at the other side of the head; an annular line winding passage extending from the cavity radially inwardly and along the post to the end of the post, said line winding passage including an annular inlet opening communicating the passage with the cavity and an annular outlet opening at the end of the post, said passage having a width at the post less than the width of the inlet opening to accommodate feeding of a dual flail line into the passage with the side of the flail line extending generally parallel to the axis and spiral winding of the dual flail line around the post without jamming.

13. The device as in claim 12 including a continuous dual flail line having a coil in the line storage cavity, a first portion extending from the coil to the inlet opening, a second portion extending through the passage and spiral wound around the post, and the flail lines of said dual flail line extending radially outwardly from the outlet opening at the end of the post.

14. The device as in claim 13 wherein said dual flail line has a width greater than its thickness and the width of the flail line in the coil in the cavity is generally parallel to said axis.

15. The device as in claim 14 wherein the width of the entire dual flail line in the head extends generally parallel to said axis.

16. A flail line assembly adapted to be wound in an annular line storage cavity in a two flail rotary flail feeding device and fed from the cavity to an annular winding passage extending from the cavity to and past a winding post, spiral wound around the post and then fed outwardly from the post to form two flails, the flail line assembly including two indefinite length flail lines, said lines each including interengageable surfaces, such interengageable surfaces on each flail line facing in opposite directions along the flail line, wherein when the flail lines are wound together around the post the interengageable surfaces of one line facing in one direction come into contact with the interengageable surfaces of an adjacent line facing in the opposite direction to prevent relative longitudinal movement of the lines around the post.

17. The flail line assembly as in claim 16 wherein each flail line includes a plurality of successive waists and protrusions, the waists and protrusions of one flail line nesting with the waists and protrusions of the other flail line to prevent relative longitudinal movement therebetween.

18. The method of feeding two flail lines from a rotary head of the type having a coil winding post with an end at one side of the head and an annular feeding passage surrounding the post and extending along the post to an annular opening at the side of the head, including the steps of:

a) positioning two lengths of flail line in the passage with end portions at the flail line extending out the annular opening;

b) rotating the head, post and lengths of flail line around an axis extending through the post;

c) winding the lengths of flail line in the passage around the post to form two coils of flail line engaging the post and two rotary flails extending radially outwardly from the annular opening having inner ends connected to the flail lines wound on the post and outer free ends; and d) preventing differential longitudinal movement between adjacent flail lines in the coil wound on the post.

19. The method of claim 15 wherein the two lengths of flail line are bonded together to form a dual flail line having a width greater than the thickness of the flail line, including the step of:

e) maintaining the width of the flail line in the head generally parallel to said axis.

20. The method of claim 17 including the step of:

f) breaking the bond between the two lengths of flail line to form the two flails.

21. The method of claim 18 including the step of:

e) providing surfaces on each length of flail line wound around the post facing in opposite directions along the lengths of the flail lines; and f) engaging the surfaces on one flail line against the surfaces on the other flail line.

22. The method of claim 21 including the step of:

g) nesting the flail lines wound on the post.

* * * * *